(12) United States Patent
Englert

(10) Patent No.: US 8,028,803 B1
(45) Date of Patent: Oct. 4, 2011

(54) MOLDING A LIGHTWEIGHT CAST ACOUSTICAL PRODUCT

(75) Inventor: Mark Englert, Libertyville, IL (US)

(73) Assignee: USG Interiors, Inc., Chicago, IL (US)

( * ) Notice: Subject to any disclaimer, the term of this patent is extended or adjusted under 35 U.S.C. 154(b) by 0 days.

(21) Appl. No.: 12/759,308

(22) Filed: Apr. 13, 2010

(51) Int. Cl.
*E04B 1/84* (2006.01)

(52) U.S. Cl. .......................... 181/294; 181/290; 181/284

(58) Field of Classification Search .................. 181/294, 181/290, 284
See application file for complete search history.

(56) References Cited

U.S. PATENT DOCUMENTS

| | | | |
|---|---|---|---|
| 3,494,824 A | 2/1970 | Roberts | |
| 3,634,562 A | 1/1972 | Kole et al. | |
| 3,925,567 A * | 12/1975 | Abe | 426/559 |
| 4,042,745 A | 8/1977 | Cornwell et al. | |
| 4,062,721 A | 12/1977 | Guyer et al. | |
| 4,330,589 A | 5/1982 | Saito et al. | |
| 4,613,627 A | 9/1986 | Sherman et al. | |
| 4,655,950 A * | 4/1987 | Michalek | 252/62 |
| 4,818,603 A * | 4/1989 | Mueller | 428/316.6 |
| 5,013,405 A | 5/1991 | Izard | |
| 5,047,120 A | 9/1991 | Izard et al. | |
| 5,360,771 A | 11/1994 | Delvaux et al. | |
| 5,824,148 A | 10/1998 | Cornwell | |
| 6,443,258 B1 * | 9/2002 | Putt et al. | 181/294 |
| 6,527,850 B2 | 3/2003 | Schwartz et al. | |
| 6,596,389 B1 * | 7/2003 | Hallett et al. | 428/317.9 |
| 6,613,424 B1 | 9/2003 | Putt et al. | |
| 6,616,804 B2 | 9/2003 | Foster et al. | |
| 6,673,144 B2 | 1/2004 | Immordino, Jr. et al. | |
| 6,780,356 B1 | 8/2004 | Putt et al. | |
| 6,964,703 B2 * | 11/2005 | Geeroms | 106/211.1 |
| RE39,339 E * | 10/2006 | Andersen et al. | 106/206.1 |
| 7,364,015 B2 | 4/2008 | Englert et al. | |
| 2002/0096278 A1 | 7/2002 | Foster et al. | |
| 2007/0102237 A1 | 5/2007 | Baig | |
| 2008/0060871 A1 | 3/2008 | Englert et al. | |

FOREIGN PATENT DOCUMENTS

EP 0 066 172 8/1982

* cited by examiner

*Primary Examiner* — Forrest M Phillips
(74) *Attorney, Agent, or Firm* — Greer, Burns & Crain, Ltd.; Pradip Sahu, Esq.; Philip T. Petti, Esq.

(57) ABSTRACT

A lightweight cast article that is made by the method of the present invention. A foamed acoustical product is prepared by blending a starch with cold water, then heating the starch/water blend to form a starch gel. Mineral wool is added to the starch gel to form a pulp and the pulp is wet-mixed until wool nodules are formed. The pulp is then combined with a surfactant and an amount of foam water. The foaming agent is selected from the group consisting of a linear sodium dodecylbenzene sulfonate, a cocamidopropyl betaine, a cocamidopropyl hydroxysultaine, their salts and mixtures thereof. Mixing of the foaming agent and pulp continues to form a foamed pulp. The foamed pulp is cast into a mold and allowing the foamed pulp to dry forming a foamed product. The foamed product is removed from the mold.

16 Claims, 9 Drawing Sheets

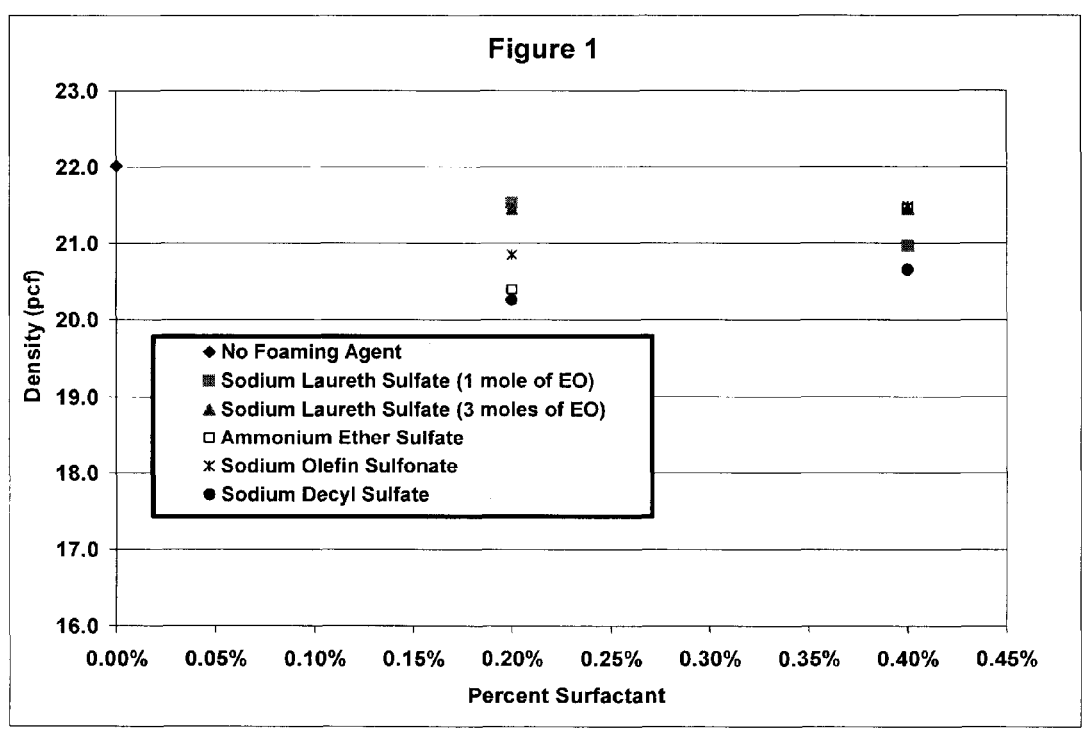

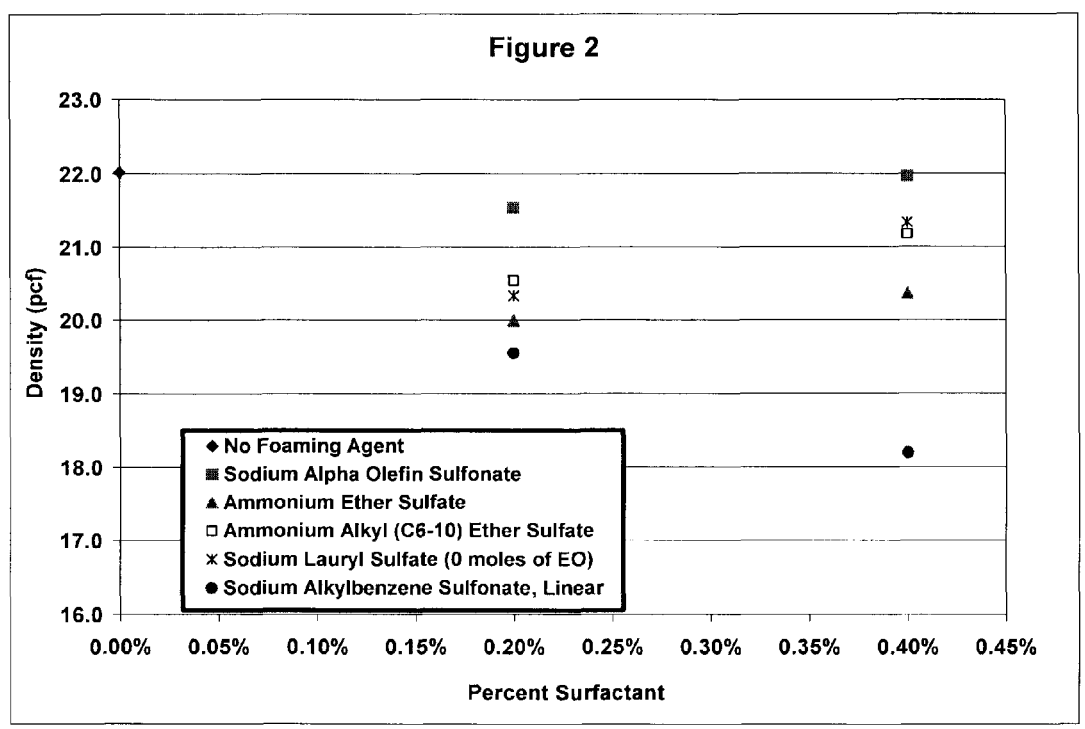

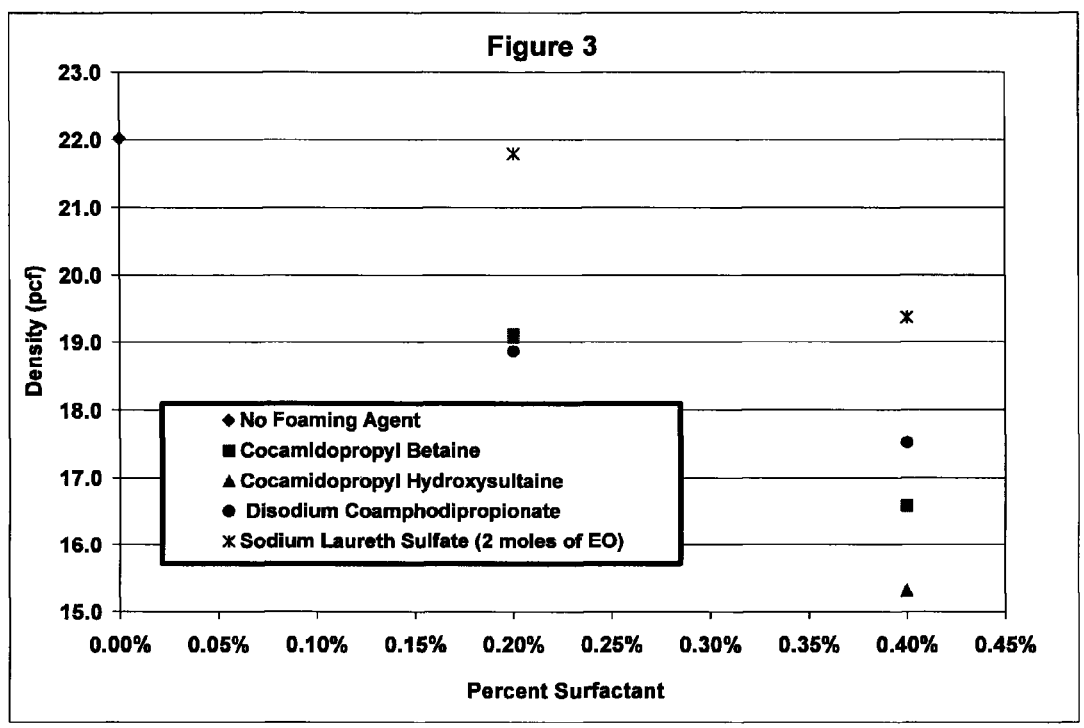

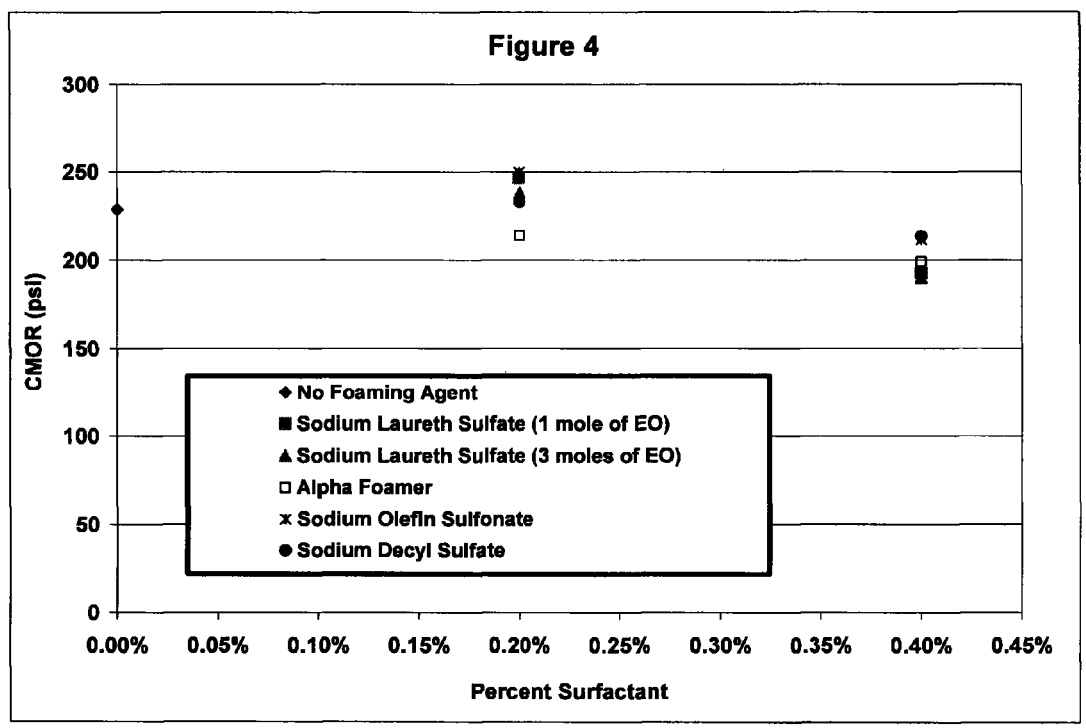

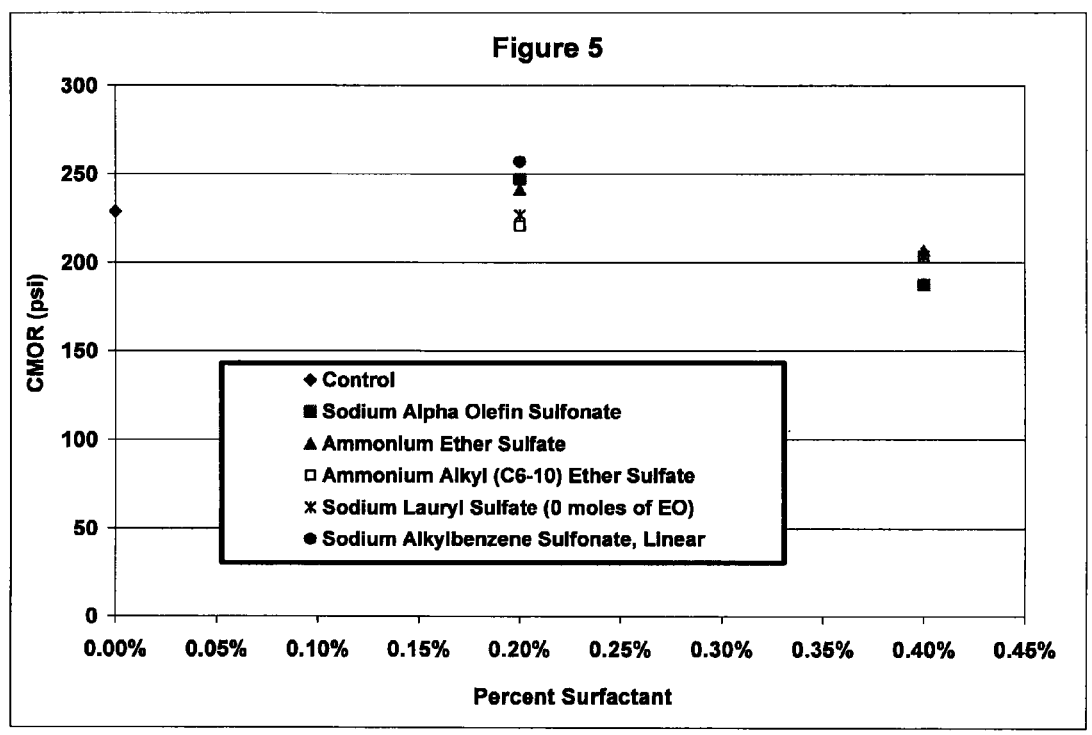

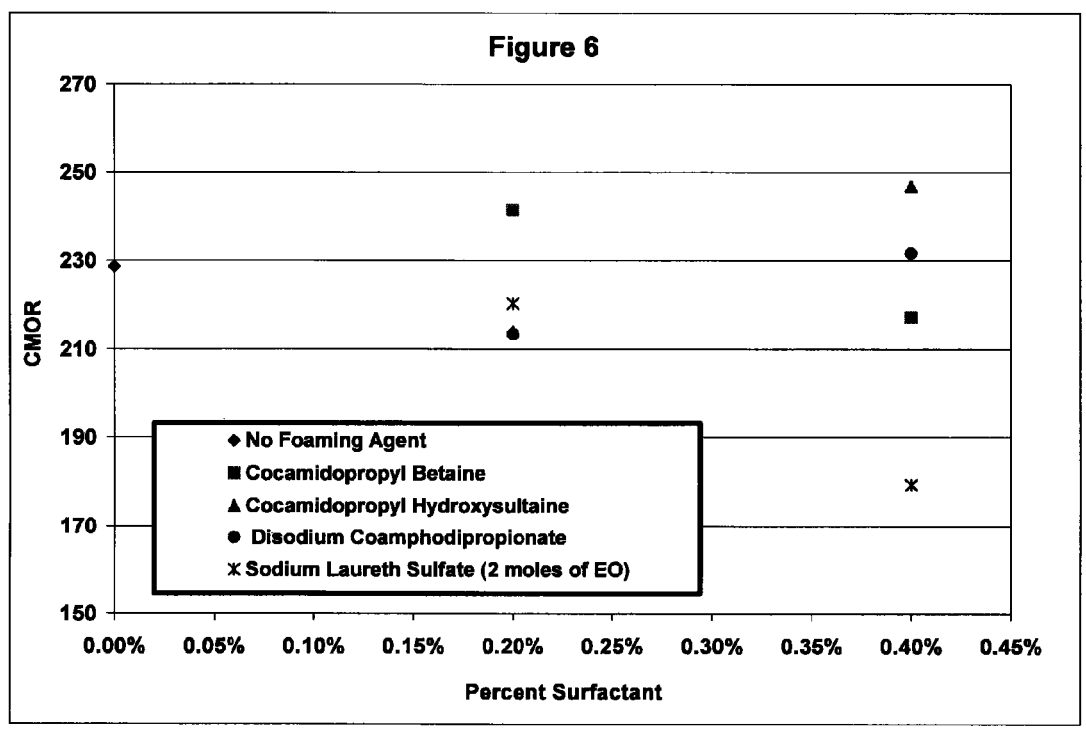

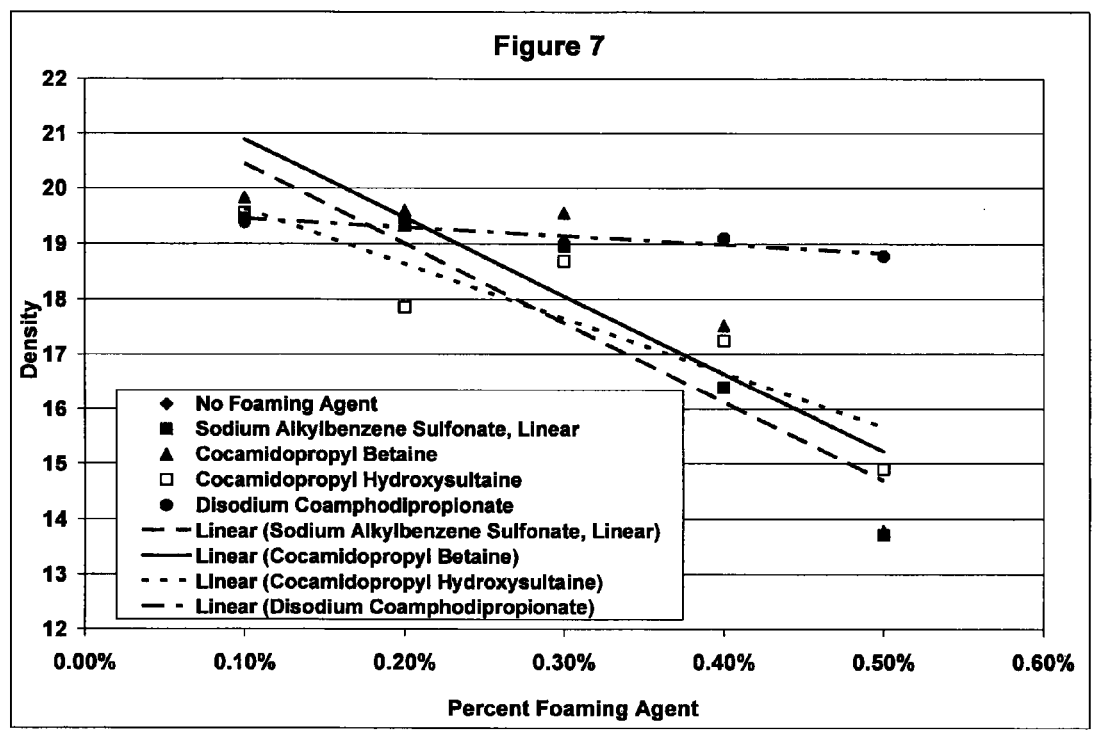

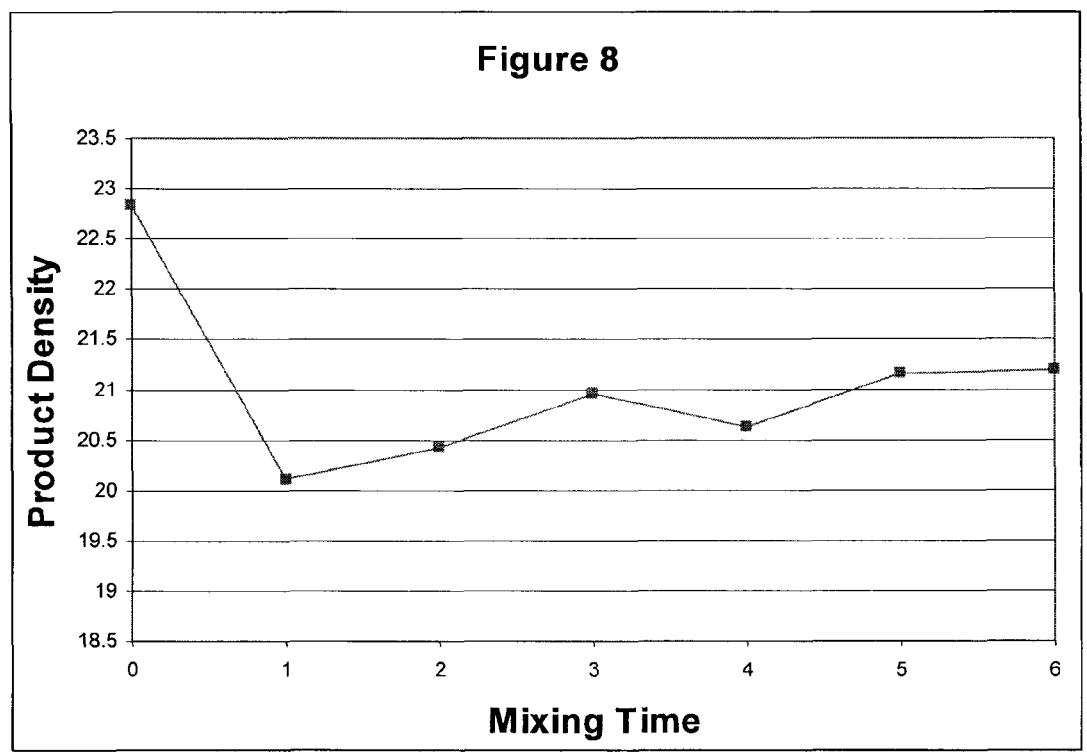

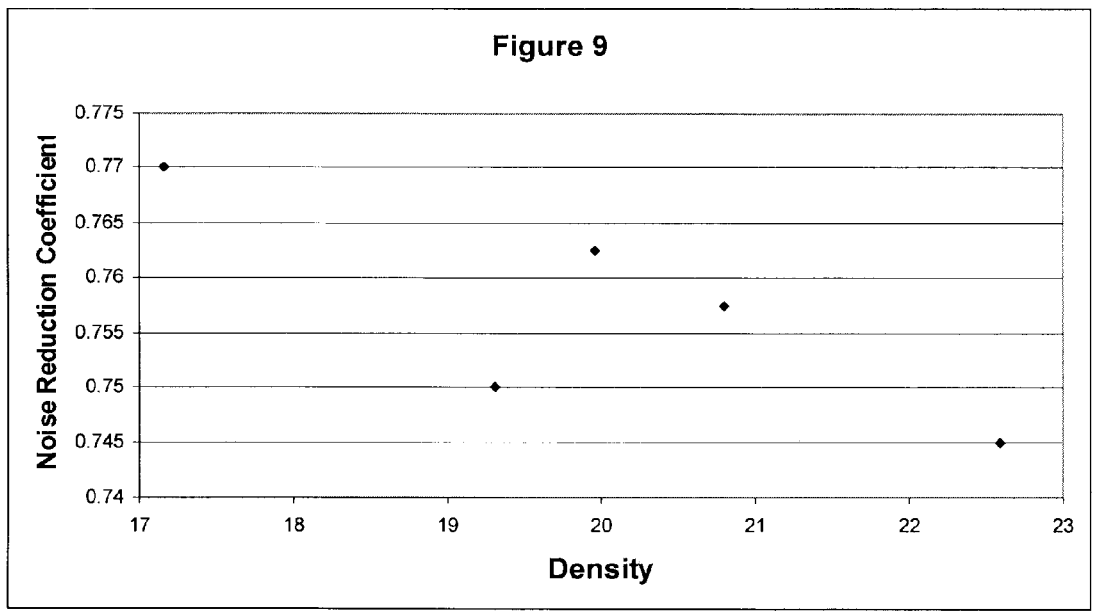

MOLDING A LIGHTWEIGHT CAST ACOUSTICAL PRODUCT

FIELD OF THE INVENTION

This invention relates to a method of making a cast sound-absorbing product. More specifically it relates to a method of making a foamed acoustical panel that produces a light weight product.

BACKGROUND OF THE INVENTION

Acoustic panels are widely used in the building construction industry. Acoustical panels are used on ceilings, on walls, in theatres or concert halls to control sound. These products absorb sound by allowing the sound to penetrate to the interior of the product, where the sound energy is absorbed. Access to the interior of the product is provided in many ways. Openings in the surface of the product allow sound to enter the product interior. The composition of the product can be designed to be at least partially transparent to sound, allowing it to pass through the product surface. Other means of admitting sound energy to the product interior can be used as are known to an artisan of acoustical products. Once inside the product interior, the sound energy is at least partially converted into mechanical or thermal energy and dissipated.

Conventional acoustical panels are made by either a felting process or a casting process. Cast products are usually higher in weight and in strength. These articles are made by mixing a fiber, binder with one or more fillers and additives and then placing the resulting pulp into trays or a mold for drying. The fiber, binder and the fillers are selected such that the resulting panel is sound absorbent. If additional sound absorbency is desired, additional voids or cavities are optionally formed into the surface of the product by embossing, pressing a design in the product. Another method of improving sound absorbency is by puncturing the product surface with needles (i.e., perfing). As with embossing above, perfing creates cavities that further promote sound absorption. One method of reducing the weight of cast products is by the addition of light weight fillers, such as expanded perlite. However, the perlite reflects sound and reduces the ability of the article to absorb sound. This results in balancing weight with sound absorbency to determine the amount of expanded perlite that is useful in a particular product.

An example of a product made by casting is described in U.S. Pat. No. 1,769,519. A pulp of mineral wool and a starch gel is cast into a mold and dried to form articles. Although these articles are effective in acoustical control, the articles are heavy. As a result, they are expensive to ship and lead to rapid fatigue in those who must transfer, carry or install the articles.

U.S. Pat. No. 4,655,950 reveals the use of an enzyme-modified, soy-based foaming agent to make a cast acoustical article that is lighter in weight. This patent teaches the addition of the foaming agent to the starch and water prior to thickening. The foamed pulp was then distributed on trays. The surface of the articles was screeded to impart a surface texture to the articles, then the wet pulp was dried in ovens at about 300° F. (149° C.) for about 16 hours.

Recent research has shown that the addition of the foaming agent prior to forming the starch gel does not always result in generation of a smooth, foamy pulp. In some circumstances, when the mineral wool fibers are added, the wool wads up into large knots, sometimes requiring shut down of the mixing equipment until the knots could be removed. The resulting pulp contained large lumps that were not aesthetically pleasing and also necessitated stopping the equipment, increasing the cost of the products.

Additional research indicates that surfactants are not consistently effective in producing a light weight acoustical product. As will be shown below, the addition of some surfactants actually caused an increase in product density. Creation of a lightweight cast article is not merely a matter of adding a surfactant and mixing the pulp to create a foamed article.

Thus, there is a long-felt need in the art for a method of making a lightweight cast article having acoustical properties. A need also exists for an acoustical product and method of making it that is free of expanded perlite. Further, a method of making an acoustical article is needed that avoids formation of large knots of mineral wool.

SUMMARY OF THE INVENTION

At least one of these needs is met by a lightweight cast article that is made by the method of the present invention. A foamed acoustical product is prepared by blending a starch with cold water followed by the addition of optional fillers and additives, then heating the starch/water blend to form a starch gel. Mineral wool is added to the starch gel to form a pulp and the pulp is wet-mixed until wool nodules are formed. The pulp is then combined with a surfactant and an amount of foam water. The foaming agent is selected from the group consisting of a linear alkylbenzene sulfonate, a cocamidopropyl betaine, a cocamidopropyl hydroxysultaine, their salts and mixtures thereof. Mixing of the foaming agent, the foam water and pulp continues to form a foamed pulp. The foamed pulp is cast into a mold or tray and the foamed pulp is dried forming a foamed product. The foamed product is removed from the tray.

A foamed acoustical product is made by this process having a structure of voids for lightness, and still has good physical and acoustical properties. The product is a dried structure of mineral wool, with spaces between the mineral wool fibers being filled with dried starch gel having voids therein. Interior surfaces of the voids are coated with a film that includes a foaming agent selected from a linear alkylbenzene sulfonate, a cocamidopropyl betaine, a cocamidopropyl hydroxysultaine, their salts and mixtures thereof. The mineral wool is in the form of loose fibers or as wool nodules of less than or equal to 3 mm. Physical properties of the product include a density of at least 16 pounds per $ft^3$ and a hardness of at least 80 lbs force.

Addition of the foaming agent and foam water after formation of the wool nodules assures the formation of properly sized wool nodules, not formation of wool knots. The wool knots do not break down with continued mixing as do the nodules of wool. At times, wool knots necessitate stopping the manufacturing line to clear the mixer from the knotted fibers. Thus, the sequence of addition of components is important to the formation of a product of the proper consistency.

It has also been discovered that, contrary to the expectation of an artisan, not all surfactants or foaming agents are useful in the preparation of lightweight acoustical panels. A number of foaming agents were found that actually result in an increase in the product density. Use of a linear alkylbenzene sulfonate, a cocamidopropyl betaine, a cocamidopropyl hydroxysultaine, their salts and mixtures thereof allows for consistent preparation of lightweight cast products.

Another unexpected advantage of the product is that the acoustical properties improve as the density decreases. Sound absorption was expected to decrease as small cavities were replaced with foam. However, the Noise Reduction Coefficient was found to be inversely proportional to product density.

DETAILED DESCRIPTION OF THE DRAWINGS

FIG. 1 is a graph of the amount and type of foaming agent vs. product density for Samples 1-10 of Examples 1 and 2;

FIG. 2 is a graph of the amount and type of foaming agent vs. product density for Samples 11-20 of Examples 1 and 2;

FIG. 3 is a graph of the amount and type of foaming agent vs. product density for Samples 21-28 of Examples 1 and 2;

FIG. 4 is a graph of the amount and type of foaming agent vs. product MOR for Samples 1-10 of Examples 1 and 2;

FIG. 5 is a graph of the amount and type of foaming agent vs. product MOR for Samples 11-20 of Examples 1 and 2;

FIG. 6 is a graph of the amount and type of foaming agent vs. product MOR for Samples 21-28 of Examples 1 and 2;

FIG. 7 is a graph of the amount and type of foaming agent vs. product density for Samples 1-20 of Examples 3 and 4;

FIG. 8 is a graph of the density as a function of mixing time for the Samples of Example 7; and FIG. 9 is a graph of the Noise Reduction Coefficient as a function of density of the Samples of Example 8.

DETAILED DESCRIPTION OF THE INVENTION

As used in this description and unless otherwise noted, amounts of components are expressed in weight percentages based on the total weight of the dry components.

Preparation of the cast, foamed article begins by blending a starch with cold water. Cold water is used to prevent premature swelling of the starch component. The term "cold water" is defined as meaning that the water has a sufficiently low temperature that swelling of the starch does not occur. Exact temperature will depend on the specific starch that is selected, however, cold water is preferable chosen to be less than 150° F. (~65° C.).

Any starch is useful that swells in the presence of hot water. Preferred starches include vegetable starches, such as corn starch, potato starch, wheat starch, tapioca and mixtures thereof. In some embodiments, unmodified, native or pearl starch is used. Modified starches are also used, including cross-linked starches such as ADM Clinton 608 Starch. Starches are preferably used in amounts of about 3.0% to about 4.2% by weight based on the total weight of the pulp, or from about 11% to about 16% by weight of the dry components. The ratio of starch to water for gel formation preferably ranges from about 0.045 to about 0.065.

Fillers are optionally combined with the starch prior to cooking in amounts of from about 10% to about 14% by weight based on the total weight of the dry components. Stucco, also known as calcined gypsum, calcium sulfate hemihydrate and Plaster of Paris is used in some embodiments. The stucco may be of either the alpha- or beta-calcined type. Alpha-calcined gypsum is somewhat spherical and is more easily fluidized in water. It is made by calcining calcium sulfate dihydrate or gypsum under pressure. When gypsum is calcined at atmospheric conditions, a different crystal form results that is more acicular, beta-calcined stucco. Either alpha-calcined gypsum, beta-calcined gypsum, or mixtures of both are useful in the product. Other useful fillers include clays, such as kaolin or ball clays, calcium carbonate, recycled dust or broke from the manufacture of acoustical products or land plaster, also known as gypsum or calcium sulfate dihydrate. The use of a filler is entirely optional, and preparation of acoustical products that include no filler is contemplated.

Another optional component is boric acid. The various functions of the boric acid are as a flame retardant, whitener and/or strengthening aid. When used, in some embodiments it is added to the cold water with the starch and stucco. Boric acid is added in amounts of about 0 to about 1.20% by weight of the dry ingredients. Particular embodiments of the product use boric acid in amounts of about 0.45% to about 0.75% by weight of the dry ingredients.

Sodium hexametaphosphate is an optional additive that is used in small amounts to increase acoustical absorption in acoustical products. While not wishing to be bound by theory, it is believed that sodium hexmetaphosphate causes localized shrinkage within the board, resulting in small cracks and/or pores inside the board structure that are available for sound absorption. It is commonly available under the tradename CALGON as a water softening agent.

The mixture of starch and water is heated to initiate swelling of the starch granules. Heating allows the swelling of the starch, which begins to thicken the mixture. Optionally, the mixture is stirred, preferably continuously, during the thickening process. This prevents excessive heating and thickening in the starch in the vicinity of the heat source. As heating continues, the starch granules continue to swell. Preferably the mixture is brought to a temperature sufficient to fully cook the starch. This forms a starch gel, which is a thick, viscous structure.

Heating of the mixture can be accomplished by any technique known in the art. In some embodiments, the sample is heated by the addition of hot water or steam to the combination of starch, filler, additives and water. This technique reduces hot spots and localized thickening of the solution. Heating methods in other embodiments include warming of and adding steam to the mixing vessel.

After preparation of the starch gel, a fiber such as mineral wool is added. Mineral wool is a fibrous material that is made from natural or synthetic minerals, stone, slag or metal oxides. Minerals are heated to about 1600° C. to a molten state. Air is then blown past a stream of the molten mass. In another method of manufacture, the molten mass is spun on a high speed spinning apparatus to create a mass of intertwined fibers. An example of a useful mineral wool is slag wool produced by USG Interiors at their Walworth, Wis. and Red Wing, Minn. plants.

The starch gel and mineral wool are wet mixed to combine them, forming a pulp. Wet mixing continues at least until wool nodules are uniformly formed and a homogeneous pulp is produced. Wool nodules are small, soft, pea-shaped balls of mineral wool up to about 0.25 inches (6 mm) in size. These nodules form naturally as a part of the mixing process. Once the nodules are formed, they can be broken down further by continued mixing under conditions of high shear. High shear mixing fractures the fibers into smaller pieces so that they fall away from the nodule, gradually reducing it in size. The length of the mixing step and the mixing conditions selected depend on the desired properties of the finished product, such as the smoothness of the surface. Any type of mixing equipment can be used that can thoroughly blend the relatively heavy pulp. A ribbon mixer is used in some embodiments. In other embodiments, particularly those on a smaller scale, one can optionally utilize a paddle mixer.

A foaming agent is added to the pulp after formation of the wool nodules. Introduction of the foaming agent too early in the process results in formation of large mineral wool knots, which are larger agglomerations of wool that can range from approximately 0.5 to 5 inches. Large knots of mineral wool can be formed that require shutting down of the system. They also impair the aesthetics of the product.

Choice of a foaming agent that produces a light weight product has been found to be elusive. A number of foaming agents were tested that, contrary to the expectations of an artisan, actually resulted in an increase in the product density. Foaming agents that have been found to form a foam sufficient to reduce product density of a cast product include, a linear alkylbenzene sulfonate such as linear sodium dodecylbenzene sulfonate, a cocamidopropyl betaine, cocamidopropyl hydroxysultaine, their salts and mixtures thereof. Several useful foaming agents by Stepan Company (Northfield, Ill.) are shown in Example 1.

Any amount of the foaming agent is used that results in a desired decrease in product density. Some embodiments utilize from about 0.01% to about 1% of active foaming agent by weight of the dry solids in the pulp. Foaming agents are often supplied in an aqueous solution. The "active" portion of the foaming agent refers to the solids only and does not include the water in which it is dissolved. In other embodiments, from about 0.1% to about 0.5% by weight of the active foaming agent is used based on the total weight of the dry components.

Foaming agents are added in amounts of from about 0.2% to about 0.4% of the pulp weight in still other embodiments measured as the active component of the foaming agent based on pulp solids. The exact amount of foaming agent required depends on the foaming agent selected, the amount of water in the pulp, the degree of mixing intensity, the amount of entrained air caused by the mixing action and the desired density reduction.

Foam water is combined with the foaming agent prior to its addition to the pulp. This aids in complete mixing of the foaming agent with the pulp and provides water for foam generation. Increasing the amount of foam water has been shown to increase the amount of foam, as evidenced by a decrease in product density. Foam water is used with the foaming agent in ratios of about 100:3 to about 100:1 in some embodiments, although any useful ratio may be used. The foaming agent and foam water are added to the pulp together.

Following addition of the foaming agent and foam water, mixing is continued to generate foam in situ in the pulp. In some embodiments, the foam is generated in the same mixer as was used to prepare the pulp. Increased mixing speed generates more foam in many embodiments, further reducing the product density.

Some embodiments of the product utilize a foam that is generated separately from the product manufacturing line and added to the pulp after formation of the wool nodules. Pre-generated foam is formed by introducing water and the foaming agent to a foam generator such as is used in the production of gypsum board. It generates foam by the high shear mixing of the foaming agent, water and air.

If the pulp is not mixed long enough, the face of the resulting product can have numerous soft spots. These spots are balls of nodulated wool that have not been penetrated by the starch gel. The balls are separated by the harder skeleton which contains a larger percentage of the binding material. The soft spots have different sound absorbing qualities than the harder skeleton structure and the valleys or interstices between the granules. By regulating the degree of wet mixing, the sound absorption and the appearance of the panel is largely controlled.

Optionally, coloring is added to the slurry prior to, concurrently with or following the addition of the mineral wool. Uniform color is obtained by thoroughly combining the color with the pulp. However, if added after the mineral wool, the coloring can be mixed only to the degree that only a portion of the mineral wool is penetrated by the color. After finishing, this presents a variegated or mottled appearance of colored and uncolored areas, resembling the appearance of natural stone. The appearance of stone, however, has no effect on the panel's porosity and sound absorption. If used, coloring is added in amounts of about 0.01% to about 4.5% by weight.

After mixing, a consistent pulp is obtained. The mass is converted into the desired shape by casting the pulp into one or more trays. A panel is the desired shape in some embodiments; however, other shapes can be created using this technique. Molding is optionally accomplished without pressing out any of the liquid or densifying the mass. The mass may be molded into suitable forms by hand or by machine, such as by use of traveling molds, a master roll for leveling off, and the like. Perforated metal plate forms may be used to facilitate later drying, paper or paper-backed aluminum foil being used on the bottom of the molds for backing. Excess pulp is screeded off to the top of the mold by hand screeding, machine screeding or roll pattern forming. If a rougher appearance is desired, screeding may be done with an edge of a screed bar, dragging up some of the mineral wool nodules and creating large fissures or valleys in the surface that extend into the tile interior. Panels made by this process have good strength characteristics, while maintaining a light weight.

Optionally, the surface of the product is embossed with a pattern prior to hardening. The pattern may increase the aesthetic value of the product by adding a decorative pattern. Embossing of the surface is also used to augment the amount of surface area that absorbs sound. For example, the addition of cavities, holes or fissures to an acoustical panel increases the ability of sound to enter the interior of the panel where it is absorbed by the hardened pulp. Embossed patterns can also be designed to perform both of these functions, using a pleasing design to increase the sound absorbency.

The product is suitably dried using any method as is known in the art. In some embodiments, the products are introduced into ovens or kilns. Drying should be done gradually as rapid drying increases product shrinkage and may cause product defects. The oven temperature is preferably from about 95° C. to about 160° C. When the product is an acoustical panel, high oven temperatures above 205° C. can scorch or burn the panel edges.

After the panels are dry, they are stripped from the trays. The paper or other backing material is typically left on the product or is optionally removed. If needed, the product, such as a panel, is cut to the desired finished size. One surface of the panel is optionally buffed or ground to remove the top surface, exposing more of the porous inner surface. Suitable means for removing the outer surface includes use of a carborundum roll, a sanding belt, a planer, sand-blasting and the like. Edges of the panel can be beveled as desired.

If desired, additional sound absorbency can be imparted to the dried product by physically creating additional holes, fissures, cavities or openings in the product surface. Commonly, spines or blades are forced through the surface and into the interior of the product. Although the spine is commonly shaped like a pin or needle, use of any shape is contemplated, including decorative designs. The spines or blades can be arranged in any manner, such as rows and columns or any useful pattern.

Example 1

Preparation of Test Boards

A base formula for a pulp for acoustical panels is shown in Table I. Starch, boric acid and stucco were weighed out into separate cups. 350 Grams of cold water was measured and placed into a small metal beaker. The dry ingredients were added to the cold water while stirring, first adding the starch, then the boric acid and finally the stucco. 2571 Grams of boiling water was added to the mixture. The mixture was stirred to achieve a homogeneous gel. Mineral wool was measured to 871 grams and placed in a HOBART® mixer. The gel was added to the mixer and mixed for 45 seconds at speed 1, forming a pulp. Unblended ingredients on the side of the mixing bowl were pushed down into the pulp and the pulp was mixed for an additional three minutes at speed 2.

TABLE I

PULP BASE FORMULA

| Component | Weight, grams | Weight Percent Solids | Percent Total Weight |
|---|---|---|---|
| Cold Water | 350 | 0.0% | 8.5% |
| Hot Water | 2571 | 0.0% | 62.5% |
| Starch | 175 | 14.7% | 4.2% |
| Boric Acid | 7.5 | 0.6% | 0.2% |
| Stucco | 141 | 11.8% | 3.4% |
| Mineral Wool | 871 | 72.9% | 21.2% |
| Total | 4115.5 | 100.0% | 100.0% |

Fourteen forming agents were screened to determine their effectiveness in decreasing product density. The foaming agent was added to samples of the base formula in amounts according to Table II.

TABLE II

FOAMING AGENT ADDITION

| Sample | Foaming Agent Brand | Foaming Agent Generic | Weight of Foaming Agent | Foaming Agent as % of Actives |
|---|---|---|---|---|
| 1C | None | None | 0 g | 0.00% |
| 1 | STEOL CS 130 | Sodium Laureth Sulfate (1 EO) | 9.54g | 0.20% |
| 2 | STEOL CS 130 | Sodium Laureth Sulfate (1 EO) | 19.08g | 0.40% |
| 3 | STEOL CS 330 | Sodium Laureth Sulfate (3 EO) | 8.53g | 0.20% |
| 4 | STEOL CS 330 | Sodium Laureth Sulfate (3 EO) | 17.06g | 0.40% |
| 5 | ALPHA FOAMER | Ammonium Ether Sulfate | 4.49g | 0.20% |
| 6 | ALPHA FOAMER | Ammonium Ether Sulfate | 8.98g | 0.40% |
| 7 | BIO-TERGE AS-40 | Sodium Olefin Sulfonate | 6.15g | 0.20% |
| 8 | BIO-TERGE AS-40 | Sodium Olefin Sulfonate | 12.3 g | 0.40% |
| 9 | POLYSTEP B-25 | Sodium Decyl Sulfate | 6.29g | 0.20% |
| 10 | POLYSTEP B-25 | Sodium Decyl Sulfate | 12.57g | 0.40% |
| 11 | STEPANTAN AS-1246 | Sodium Alpha Olefin Sulfonate | 5.19g | 0.20% |
| 12 | STEPANTAN AS-1246 | Sodium Alpha Olefin Sulfonate | 10.39g | 0.40% |
| 13 | CEDEPAL FA-406 | Ammonium Ether Sulfate | 4.15g | 0.20% |
| 14 | CEDEPAL FA-406 | Ammonium Ether Sulfate | 8.30g | 0.40% |
| 15 | PETRO STEP ES-65A | Ammonium Alkyl Ether Sulfate | 3.70g | 0.20% |
| 16 | PETROSTEP ES-65A | Ammonium Alkyl Ether Sulfate | 7.41g | 0.40% |
| 17 | POLYSTEP B-5 | Sodium Laureth Sulfate (0 EO) | 8.24g | 0.20% |
| 18 | POLYSTEP B-5 | Sodium Laureth Sulfate (0 EO) | 16.48g | 0.40% |
| 19 | Biosoft D-40 | Linear Sodium Alkylbenzene Sulfonate | 6.34g | 0.20% |
| 20 | Biosoft D-40 | Linear Sodium Alkylbenzene Sulfonate | 12.69g | 0.40% |
| 21 | PETROSTEP CG-50 | Cocamidopropyl Betaine | 6.39g | 0.20% |
| 22 | PETROSTEP CG-50 | Cocamidopropyl Betaine | 12.79g | 0.40% |
| 23 | PETROSTEP SB | Cocamidopropyl Hydroxysultaine | 4.81g | 0.20% |
| 24 | PETROSTEP SB | Cocamidopropyl Hydroxysultaine | 9.62g | 0.40% |
| 25 | AMPHOSOL 2CSF | Disodium Coamphodipropionate | 5.97g | 0.20% |
| 26 | AMPHOSOL 2CSF | Disodium Coamphodipropionate | 11.95g | 0.40% |
| 27 | STEOL CS 230 | Sodium Laureth Sulfate (2 EO) | 9.03g | 0.20% |
| 28 | STEOL CS 230 | Sodium Laureth Sulfate (2 EO) | 18.06g | 0.40% |

Sample 1C is a comparative sample containing no foaming agent. Test boards were prepared by adding the amount of the foaming agent sample from Table II to one 4115.5 gram sample of pulp from Table I. The foaming agent was added with 400 grams of foam water after the final mixing step described above. Following foaming agent and foam water addition, the pulp was mixed at speed 3 for an additional 4 minutes to generate foam. The pulp was then cast into a standard board form and excess pulp was screeded from the top of the mold. Cast boards were dried overnight in a 300° F. (149° C.) oven. The weight of foaming agent used at the same percentage amounts varies. This is because the different foaming agents contain different amounts of the active ingredient in the component. In the calculated percentages, only the active ingredient was considered.

Example 2

Test Board Properties

Physical properties of each of the test boards made in Example 1 were measured. Results are shown in Table III.

TABLE III

TEST BOARD PROPERTIES

| Sample | Thickness | Density | MOR | CMOR | MOE | Hardness |
|---|---|---|---|---|---|---|
| 1C | 0.855 | 22.01 | 228.8 | 228.6 | 33570 | 291.3 |
| 1 | 0.769 | 21.53 | 235.8 | 246.4 | 37226 | 298.8 |
| 2 | 0.769 | 20.97 | 175.1 | 192.7 | 25485 | 235.9 |
| 3 | 0.755 | 21.45 | 226.3 | 238.1 | 34952 | 312.6 |
| 4 | 0.738 | 21.45 | 180.7 | 190.2 | 28415 | 226.0 |
| 5 | 0.781 | 20.40 | 184.3 | 214.1 | 31388 | 256.0 |
| 6 | 0.751 | 21.46 | 189.2 | 199.0 | 31985 | 263.1 |
| 7 | 0.780 | 20.85 | 224.2 | 249.6 | 35751 | 309.8 |
| 8 | 0.762 | 21.48 | 201.7 | 211.6 | 28249 | 254.1 |
| 9 | 0.801 | 21.16 | 197.5 | 233.0 | 36063 | 258.8 |
| 10 | 0.795 | 20.65 | 188.4 | 213.6 | 31305 | 268.6 |
| 11 | 0.753 | 21.54 | 236.8 | 247.0 | 23397 | 304.6 |
| 12 | 0.744 | 21.97 | 186.9 | 187.4 | 10111 | 266.9 |
| 13 | 0.833 | 19.99 | 199.0 | 241.0 | 28310 | 226.1 |
| 14 | 0.717 | 21.36 | 177.1 | 206.8 | 12840 | 212.2 |
| 15 | 0.797 | 20.54 | 192.3 | 220.7 | 15892 | 247.5 |
| 16 | 0.774 | 21.18 | 188.0 | 202.8 | 10161 | 253.0 |
| 17 | 0.792 | 21.33 | 193.6 | 226.8 | 19685 | 250.1 |
| 18 | 0.766 | 21.34 | 192.0 | 203.7 | 13406 | 286.2 |
| 19 | 0.816 | 19.55 | 203.0 | 257.0 | 19022 | 231.2 |
| 20 | 0.828 | 18.19 | 128.2 | 187.5 | 5691 | 134.1 |
| 21 | 0.823 | 19.11 | 182.3 | 241.5 | 15270 | 216.1 |
| 22 | 0.814 | 16.58 | 123.2 | 217.1 | 5597 | 151.2 |
| 23 | 0.815 | 19.07 | 160.8 | 214.1 | 10423 | 204.5 |
| 24 | 0.815 | 15.31 | 119.7 | 246.9 | 5350 | 105.1 |
| 25 | 0.832 | 18.86 | 157.0 | 213.4 | 9835 | 191.3 |
| 26 | 0.850 | 17.52 | 146.6 | 231.6 | 7609 | 150.4 |
| 27 | 0.760 | 21.79 | 216.3 | 220.3 | 24165 | 326.9 |
| 28 | 0.752 | 19.37 | 139.2 | 179.3 | 6471 | 193.6 |

MOR testing was conducted on an Instron 3345 test instrument using a 5000 N (~1000 lb) load cell. A crosshead speed of 2.0 in/min was used. The term "hardness" refers to hardness as measured by a two-inch ball hardness test. It was conducted on the Instron 3345 test instrument using a 5000 N (~1000 lb) load cell and a crosshead speed of 0.10 in/min. Tests were conducted according to ASTM C 367-99 entitled "Standard Test Methods for Strength Properties of Prefabricated Architectural Acoustical Tile or Lay-In Ceiling Panels."

As is evident from the results of Table II, many of the foaming agents had negligible or adverse effects on the product density. In samples 3-8 and 11-18, as the amount of foaming agent increased from 0.20% to 0.40% of the pulp weight, the product density remained the same or even increased. Samples 1-2, 9-10 and 27-28 showed a decrease in density between the 0.2% and 0.4% foaming agent samples, but failed to show a significant decrease in density between the comparative sample and the 0.2% sample. Only four samples, those of the linear sodium dodecylbenzene sulfonate, cocamidopropyl betaine, cocamidopropyl hydroxysultaine and disodium coamphodipropionate showed a consistent decrease in product density.

Example 3

Preparation of Test Samples

The most promising foaming agents identified in the screening tests of Examples 1 and 2 were selected for additional testing. Samples of the pulp base formula were prepared according to Example 1 with foaming agents, if present, added according to Table IV.

TABLE IV

COMPOSITION OF TEST BOARDS

| Board | Foaming Agent | % Foaming Agent | Thickness |
|---|---|---|---|
| 1C | None | None | 0.855 |
| 1 | Linear Sodium Alkylbenzene Sulfonate | 0.10% | 0.807 |
| 2 | Linear Sodium Alkylbenzene Sulfonate | 0.20% | 0.825 |
| 3 | Linear Sodium Alkylbenzene Sulfonate | 0.30% | 0.817 |
| 4 | Linear Sodium Alkylbenzene Sulfonate | 0.40% | 0.843 |
| 5 | Linear Sodium Alkylbenzene Sulfonate | 0.50% | 0.823 |
| 6 | Cocamidopropyl Betaine | 0.10% | 0.798 |
| 7 | Cocamidopropyl Betaine | 0.20% | 0.809 |
| 8 | Cocamidopropyl Betaine | 0.30% | 0.825 |
| 9 | Cocamidopropyl Betaine | 0.40% | 0.770 |
| 10 | Cocamidopropyl Betaine | 0.50% | 0.823 |
| 11 | Cocamidopropyl Hydroxysultaine | 0.10% | 0.807 |
| 12 | Cocamidopropyl Hydroxysultaine | 0.20% | 0.856 |
| 13 | Cocamidopropyl Hydroxysultaine | 0.30% | 0.790 |
| 14 | Cocamidopropyl Hydroxysultaine | 0.40% | 0.806 |
| 15 | Cocamidopropyl Hydroxysultaine | 0.50% | 0.800 |
| 16 | Disodium Cocamphodipropionate | 0.10% | 0.822 |
| 17 | Disodium Cocamphodipropionate | 0.20% | 0.807 |
| 18 | Disodium Cocamphodipropionate | 0.30% | 0.820 |
| 19 | Disodium Cocamphodipropionate | 0.40% | 0.806 |
| 20 | Disodium Cocamphodipropionate | 0.50% | 0.814 |

Example 4

Physical Properties of Boards

The boards prepared in Example 3 were tested for physical properties using the same test methods of Example 2. Results of the testing are shown in Table V.

TABLE V

PHYSICAL PROPERTIES OF BOARDS

| Board | Density | MOR | CMOR | MOE | Hardness |
|---|---|---|---|---|---|
| 1C | 22.01 | 228.8 | 228.6 | 33570 | 291.3 |
| 1 | 19.45 | 211.0 | 270.0 | 21657 | 221.4 |
| 2 | 19.32 | 177.7 | 230.4 | 12890 | 194.3 |
| 3 | 18.95 | 152.9 | 206.0 | 8195 | 196.0 |
| 4 | 16.39 | 116.0 | 209.1 | 5183 | 112.9 |
| 5 | 13.71 | 88.6 | 228.3 | 68807 | 81.7 |
| 6 | 19.83 | 211.1 | 259.7 | 20434 | 251.8 |
| 7 | 19.59 | 201.1 | 253.4 | 18403 | 231.8 |
| 8 | 19.55 | 188.9 | 239.3 | 20256 | 242.4 |
| 9 | 17.51 | 143.5 | 226.1 | 6851 | 177.2 |
| 10 | 13.78 | 102.4 | 260.5 | 6050 | 87.5 |
| 11 | 19.55 | 210.6 | 266.8 | 27836 | 245.6 |
| 12 | 17.85 | 169.0 | 256.5 | 15008 | 189.8 |
| 13 | 18.69 | 173.0 | 239.8 | 10730 | 209.3 |
| 14 | 17.24 | 153.8 | 249.2 | 7606 | 160.4 |
| 15 | 14.90 | 115.5 | 251.8 | 7043 | 111.1 |
| 16 | 19.38 | 184.6 | 237.8 | 13276 | 192.2 |
| 17 | 19.44 | 190.6 | 244.0 | 15376 | 188.8 |
| 18 | 19.01 | 164.9 | 220.9 | 10436 | 175.4 |
| 19 | 19.09 | 188.8 | 250.6 | 14182 | 190.9 |
| 20 | 18.78 | 163.6 | 224.0 | 9998 | 168.7 |

As is evident from the results of Table V, three of the four foaming agents showed a consistent and significant decrease in density as the level of foaming agent was increased. These three samples were 1. Biosoft D-40, a linear sodium dodecylbenzene sulfonate, 2. Petrostep® CG-50, a cocamidopropyl betaine, and 3. Petrostep® SB, a cocamidopropyl hydroxysultaine.

Example 5

Effects of Mixing Speed, Mixing Duration and Foam Water

A lab study was conducted to explore the effects that mixing speed, mixing duration and the amount of foam water (surfactant dilution) have on the board density and physical properties. Samples were prepared according to the method of Example 1 using the pulp base formula. The cocamidopropyl hydroxysultaine foaming agent was added to all samples in amounts of about 0.25% (6.01 g). Changes in the above-referenced variables are shown in Table VI. Mixing speed and duration refer to the final mixing step for foam generation.

TABLE VI

EFFECTS OF MIXING SPEED, DURATION AND ADDED FOAM WATER

| Board | Thickness | Foam Water, g | Mixing Speed | Mixing Time, min. |
|---|---|---|---|---|
| 21 | 0.861 | 0 | 3 | 4 |
| 22 | 0.849 | 200 | 3 | 4 |
| 23 | 0.834 | 400 | 3 | 4 |
| 24 | 0.882 | 600 | 3 | 4 |
| 25 | 0.810 | 400 | 2 | 2 |
| 26 | 0.886 | 400 | 2 | 4 |
| 27 | 0.789 | 400 | 2 | 6 |
| 28 | 0.827 | 400 | 3 | 2 |
| 29 | 0.816 | 400 | 3 | 4 |
| 30 | 0.834 | 400 | 3 | 6 |

Testing of the boards for physical properties was carried out according to the methods of Example 2, using the same equipment. Results of the tests are shown in Table VII.

TABLE VII

PHYSICAL PROPERTIES OF BOARDS OF TABLE VI

| Board | Density | MOR | CMOR | MOE | Hardness |
|---|---|---|---|---|---|
| 21 | 19.63 | 170.4 | 213.5 | 23900 | 180.3 |
| 22 | 19.32 | 168.7 | 218.7 | 24415 | 188.9 |
| 23 | 18.28 | 143.1 | 207.6 | 22783 | 169.0 |
| 24 | 15.51 | 126.7 | 256.6 | 20284 | 118.1 |
| 25 | 18.89 | 166.0 | 225.0 | 28155 | 216.3 |
| 26 | 17.61 | 129.7 | 218.9 | 21902 | 168.8 |
| 27 | 17.68 | 137.4 | 212.9 | 27104 | 169.8 |
| 28 | 18.25 | 158.7 | 230.7 | 22242 | 170.0 |
| 29 | 17.83 | 146.7 | 223.5 | 23927 | 182.6 |
| 30 | 17.18 | 155.3 | 254.7 | 23769 | 136.4 |

At 0.25% foaming agent, the cocamidopropyl hydroxysultaine showed a decrease in density as the amount of foam water increased. It is believed that the addition of foam water produces more foam and the resulting reduction in density. Comparing boards 25-27 with 28-30 shows that an increase in mixing speed also generates more foam and decreases density. Effects of mixing duration were less clear. At both mixing speeds, density dropped for the first 4 minutes of mixing, but increased the last two minutes of mixing. Neither the mixing speed nor the mixing duration had a noticeable effect on the board physical properties other than density.

Example 6

Generation of Wool Knots

A plant trail was conducted to produce an acoustical material. The components and proportions of the base pulp of Example 1 were used in a larger batch size. Bio-Soft D-40 was measured in an amount of 0.40% by weight (6.1 lbs.) and added to approximately 300 lbs of foam water. Foam water temperature was kept above the cloud point of 46° F. The foaming agent was added to the water and combined by stirring with a spatula.

The foaming agent and foam water were poured into the top of a ribbon mixer. Using the ribbon mixer, mixing time following mineral wool addition was typically 7.5 minutes (450 seconds) for complete formation of wool nodules. During this test, mixing was stopped after 5.5 minutes of mixing and a control sample was taken. The aqueous solution of foaming agent was added and mixing was resumed. Samples were collected every 30 seconds for an additional two minutes. Boards 1'×1'×¾" were cast from the samples, slightly overfilling the tray. The tray was passed under a screed bar to scrape off any excess pulp and the product was dried in the production dryer. Density of each of the samples is reported in Table VIII.

TABLE VIII

DENSITY OF FOAMED PRODUCTS

| Mixing Time following Foaming Agent Addition | Product Density |
|---|---|
| 0 (Prior to Foaming Agent Addition) | 25.68 |
| 30 seconds | 21.42 |
| 60 seconds | 21.31 |
| 90 seconds | 21.60 |
| 120 seconds | 21.25 |

Test data show that after the initial 30 seconds, no substantial decrease in density occurred. However, there were wool knots greater than 0.5 inches (12 mm) present in the foamed pulp. These knots reduced the aesthetic value of the product. When the tray passed under the screed bar, the wool knot caught on the bar was pulled up above the surface of the product, leaving a large, unsightly void upstream of the knot.

Example 7

A starch gel was prepared according to the method of Example 1 in the amounts of Table IX.

TABLE IX

COMPOSITION OF STARCH GEL

| Component | Weight | % Total Composition | % Solids |
|---|---|---|---|
| Cold Water | 1250 | 20.71 | |
| Hot Water | 4000 | 66.28 | |
| Steam | 200 | 3.31 | |
| Starch | 300 | 4.97 | 51.25 |
| Stucco | 270 | 4.47 | 46.13 |
| Calgon | 0.3 | 0.01 | 0.06 |
| Boric Acid | 15 | 0.25 | 2.56 |

After the gel was prepared, mineral wool was added to a portion of the gel and the pulp was mixed for 390 seconds. The foaming agent, Bio-Soft D-40, was measured out and spread among eight 5-gallon buckets. A total of 300 lbs of cold water was divided among the eight buckets and stirred with a large spatula to combine. The foaming agent was then added to the prepared pulp by pouring the diluted foaming agent into the top of a ribbon mixer and mixed for one minute. Composition of the foamed pulp is shown in Table X.

TABLE X

COMPOSITION OF FOAMED PULP

| Component | Amount |
| --- | --- |
| Starch Gel | 2275 |
| Foaming Agent | 6.16 |
| Dilution Water | 300 |
| Mineral Wool | 700 |

Six additional samples that were sufficient in size to prepare a 12"×12"×¾" test panel were taken through a view port at one minute intervals. Mixing continued between taking each of the samples. The samples were prepared on standard trays and were dried in the plant drier. Finished sample boards were tested for physical properties using the same test methods of Example 2 and the results are shown in Table XI and FIG. 8.

TABLE XI

PHYSICAL PROPERTIES OF TEST SAMPLES

| Sample | Foaming Agent | Mixing Time | Thickness | Density | MOR | CMOR | MOE | Hardness |
| --- | --- | --- | --- | --- | --- | --- | --- | --- |
| 1C | 0 | 0 | 0.790 | 22.83 | 254.4 | 247.2 | 40032 | 302.3 |
| 1 | 0.25 | 1 | 0.769 | 20.10 | 183.9 | 230.4 | 31081 | 214.9 |
| 2 | 0.25 | 2 | 0.784 | 20.41 | 206.8 | 251.2 | 37584 | 238.1 |
| 3 | 0.25 | 3 | 0.741 | 20.95 | 191.1 | 220.4 | 37940 | 235.0 |
| 4 | 0.25 | 4 | 0.754 | 20.63 | 210.9 | 250.6 | 37207 | 248.5 |
| 5 | 0.25 | 5 | 0.748 | 21.16 | 185.6 | 210.0 | 33457 | 251.0 |
| 6 | 0.25 | 6 | 0.736 | 21.20 | 191.6 | 215.8 | 39071 | 220.9 |

Comparing Sample 1C prior to foaming agent addition and Sample 1 after addition of foaming agent and mixing for one minute, the density drops dramatically. As expected, this is due to foam formation which decreases the density. However subsequent samples show an increase in density. This is believed to be due to breakdown of the mineral wool into smaller fibers.

Example 8

Acoustical Testing

Samples of foamed acoustical products were prepared and subjected to acoustical testing. Five samples, labeled A-E, were prepared according to the methods of Example 7 using the amounts of Table VIII to have varying densities. The composition of the samples is shown in Table XII below.

TABLE XII

COMPOSITION OF STARCH GEL FOR SAMPLES A-E

| Component | Sample A | Sample B | Sample C | Sample D | Sample E |
| --- | --- | --- | --- | --- | --- |
| Cold Water | 1250 | 1250 | 1250 | 1250 | 1250 |
| Hot Water | 4000 | 4000 | 4000 | 4000 | 4000 |
| Steam | 200 | 200 | 200 | 200 | 200 |
| Starch | 315 | 315 | 310 | 300 | 300 |
| Stucco | 270 | 270 | 270 | 195 | 270 |
| Dust | 0 | 0 | 0 | 75 | 0 |
| Calgon | 0.3 | 0.3 | 0.33 | 0 | 0.3 |
| Boric Acid | 15 | 15 | 15 | 15 | 15 |
| Totals | 6050.3 | 6050.3 | 6045.3 | 6035 | 6035.3 |

A portion of the starch gel was combined with mineral wool and a foaming agent diluted in water as described in Example 7. The composition of the foamed pulp for each sample is shown in Table XIII.

TABLE XIII

FOAMED PULP COMPOSITIONS FOR SAMPLES A-E.

| Component | Sample A | Sample B | Sample C | Sample D | Sample E |
| --- | --- | --- | --- | --- | --- |
| Starch Gel | 2400 | 1200 | 2425 | 2250 | 2275 |
| Foaming Agent | 6.16 | 4.86 | 6.15 | 6.15 | 6.16 |
| Dilution Water | 300 | 150 | 250 | 250 | 300 |
| Mineral Wool | 700 | 350 | 700 | 600 | 700 |
| Totals | 3406.16 | 1554.86 | 3881.15 | 3106.15 | 3218.16 |

The foamed pulp was formed into sample boards using the normal production conveying equipment. Each of the boards was tested for the Noise Reduction Coefficient ("NRC") to determine its ability to absorb sound according to ASTM C-423-08 entitled "Sound Absorption and Sound Absorption Coefficients by Reverberation Room Method". Table XIV contains the density and NRC values for each of samples A-E

TABLE XIV

PHYSICAL PROPERTIES OF SAMPLES A-E

| Test | Sample A | Sample B | Sample C | Sample D | Sample E |
| --- | --- | --- | --- | --- | --- |
| Density | 19.96 | 17.16 | 19.31 | 20.80 | 22.59 |
| NRC | 0.7625 | 0.7700 | 0.7500 | 0.7575 | 0.7450 |

FIG. 9 is a graph of the noise reduction against the sample density. Unexpectedly, the noise reduction varied inversely with the product density. Thus, in addition to the reduction in weight, this invention also produced an unexpected improvement in the acoustical properties.

While a particular embodiment of foaming of a cast product has been shown and described, it will be appreciated by those skilled in the art that changes and modifications may be made thereto without departing from the invention in its broader aspects and as set forth in the following claims.

What is claimed is:

1. A method of making a foamed acoustical product comprising:
   blending a starch with cold water;
   heating the starch/water blend to form a starch gel;
   adding mineral wool to the starch gel to form a pulp;
   wet mixing the pulp until wool nodules are formed;
   combining a surfactant with an amount of foam water, said surfactant being selected from the group consisting of a linear alkylbenzene sulfonate, a cocamidopropyl betaine, a cocamidopropyl hydroxysultaine, their salts and mixtures thereof;

mixing the surfactant, foam water and pulp to form a foamed pulp;

casting the foamed pulp into a mold;

allowing the foamed pulp to dry forming a foamed product;

removing the foamed product from the mold.

2. The method of claim 1 wherein the product of said method is free of perlite addition.

3. The method of claim 1 wherein the starch of said blending step comprises a vegetable starch.

4. The method of claim 3 wherein the vegetable starch of said blending step further comprises one of the group selected from corn, potato, wheat and tapioca starch.

5. The method of claim 4 wherein the vegetable starch is preferably a cross-linked corn starch.

6. The method of claim 1 wherein said mixing step comprises making a preformed foam and mixing the preformed foam into the wet pulp.

7. The method of claim 1 wherein said incorporating step further comprises adding a surfactant solution to the wet pulp and agitating the wet pulp to form the foamed pulp.

8. The method of claim 1 wherein said casting step comprises casting a panel.

9. The method of claim 1 wherein said combining step further comprises mixing the surfactant, water and pulp in a ribbon mixer.

10. The method of claim 1 wherein said heating step comprises adding steam to the starch/water mixture.

11. The method of claim 1 wherein the mineral wool of said adding step is added as fibrous mineral wool.

12. The method of claim 1 wherein said blending step further comprises blending fillers and boric acid with the starch/cold water mixture.

13. The method of claim 12 wherein the filler of said blending step comprises stucco.

14. The method of claim 1 further comprising texturizing the surface of the product.

15. A foamed acoustical product comprising: a dried structure of mineral wool, the spaces between the mineral wool fibers being filled with dried starch gel having voids therein, an interior surface of said voids being coated with a film selected from the group consisting of a linear alkylbenzene sulfonate, a cocamidopropyl betaine, a cocamidopropyl hydroxysultaine, their salts and mixtures thereof; said mineral wool being in the form of wool nodules of less than or equal to 3 mm; and wherein said product has a density of at least 16 pounds per $ft^3$ and a hardness of at least 80 lbs force.

16. The product according to claim 15 further comprising at least one of the group consisting of gypsum, boric acid and mixtures thereof.

* * * * *